United States Patent
Wu et al.

(10) Patent No.: US 8,111,600 B2
(45) Date of Patent: *Feb. 7, 2012

(54) METHOD OF VERTICAL DEVIATION DISC DETECTION

(75) Inventors: Shang-Wei Wu, Hsin-Chu (TW); Hsu-Feng Ho, Hsin-Chu (TW)

(73) Assignee: Mediatek, Inc., Hsin-Chu (TW)

( * ) Notice: Subject to any disclaimer, the term of this patent is extended or adjusted under 35 U.S.C. 154(b) by 791 days.

This patent is subject to a terminal disclaimer.

(21) Appl. No.: 12/124,198

(22) Filed: May 21, 2008

(65) Prior Publication Data

US 2008/0219121 A1 Sep. 11, 2008

Related U.S. Application Data

(63) Continuation of application No. 11/637,875, filed on Dec. 13, 2006, now Pat. No. 7,394,050, which is a continuation of application No. 10/867,692, filed on Jun. 16, 2004, now abandoned.

(30) Foreign Application Priority Data

Jul. 9, 2003 (TW) .............................. 92118777 A (51) Int. Cl.
*G11B 7/00* (2006.01)

(52) U.S. Cl. ................. 369/53.19; 369/44.32; 369/53.23

(58) Field of Classification Search ............... 369/44.32, 369/44.13, 53.23, 53.28, 44.11, 267, 53.19
See application file for complete search history.

(56) References Cited

U.S. PATENT DOCUMENTS

| | | | |
|---|---|---|---|
| 5,187,696 A | 2/1993 | Ishii et al. | |
| 5,268,888 A | 12/1993 | Terada | |
| 5,477,514 A | 12/1995 | Watanabe et al. | |
| 5,572,501 A | 11/1996 | Kim | |
| 5,852,592 A | 12/1998 | Braat | |
| 5,912,867 A * | 6/1999 | Miyazono | 369/44.27 |
| 6,246,648 B1 * | 6/2001 | Kuribayashi | 369/44.32 |
| 6,295,256 B1 * | 9/2001 | Kimikawa et al. | 369/44.32 |
| 6,526,007 B1 * | 2/2003 | Fujita | 369/44.32 |
| 6,674,696 B1 | 1/2004 | Ichimura et al. | |
| 6,842,414 B1 * | 1/2005 | Park | 369/53.19 |
| 7,394,050 B2 * | 7/2008 | Wu et al. | 250/201.5 |
| 2001/0014063 A1 | 8/2001 | Lin | |
| 2002/0105879 A1 | 8/2002 | Hashimoto | |
| 2003/0080274 A1 | 5/2003 | Izumi et al. | |
| 2003/0202437 A1 * | 10/2003 | Yamada et al. | 369/44.29 |
| 2004/0094690 A1 * | 5/2004 | Yu-Hung et al. | 250/201.5 |
| 2004/0094890 A1 | 5/2004 | Yu-Hung et al. | |
| 2004/0224041 A1 | 11/2004 | Morishima | |

* cited by examiner

*Primary Examiner* — Wayne Young
*Assistant Examiner* — Thomas Alunkal
(74) *Attorney, Agent, or Firm* — Patterson & Sheridan, LLP (57) ABSTRACT

A method for detecting whether vertical deviation of an optical disc occurs is provided. First, before a pickup head is successfully focused on the optical disc, a pickup head is actuated based on an input control signal so as to generate a focus error signal with a plurality of S-curves. Then, a plurality of zero crossing points of the S-curves in the focus error signal is identified and a plurality of input control values respectively corresponding to the zero crossing points is obtained. A variation of the input control values is then calculated. Whether vertical deviation of the optical disc occurs can be determined according to the variation of the input control values.

6 Claims, 7 Drawing Sheets

METHOD OF VERTICAL DEVIATION DISC DETECTION

RELATED APPLICATIONS

This is a continuation application of U.S. application Ser. No. 11/637,875, filed Dec. 13, 2006, U.S. Pat. No. 7,394,050 which is a continuation application of U.S. application Ser. No. 10/867,692, filed Jun. 16, 2004, now abandoned which in turn claims priority to Taiwanese Application 092118777, filed Jul. 9, 2003, all of which are incorporated by reference herein.

BACKGROUND OF THE INVENTION

1. Field of the Invention

The present invention relates to a detection method, and more particularly, to a method for detecting whether vertical deviation of an optical disc occurs while the optical disc is spinning in an optical disc player or an optical disc writer.

2. Description of the Prior Art

Vertical deviation refers to the wobbling of an optical disc, along the perpendicular direction of the spinning level that the optical disc is spinning on, while the optical disc is spinning in the optical disc player or optical disc writer. Vertical deviation causes data reading to be unstable, writing quality to be inconsistent, and noise to be produced while the machine is operating.

Vertical deviation usually results from poor quality of the optical disc; this kind of undesired disc is called vertical deviation disc. In the field of disc manufacturing, there are many related technologies to prevent vertical deviation discs from being manufactured. Besides, many industrial instruments are used to detect whether an optical disc is a vertical deviation disc.

However, consumers may encounter a vertical deviation disc while using an optical disc player or optical disc writer. The reason could be attributed to inadequate quality management of the disc manufacturer or the imbalanced mass of the optical disc caused by damage after the optical disc left the factory. Because the prevention of vertical deviation is considered to be the responsibility of the disc manufacturers, optical disc players or optical disc writers generally don't include the detection method for detecting whether the optical disc is a vertical deviation disc.

Besides, an optical disc player or optical disc writer can read some of the vertical deviation discs. In the prior art, an optical disc player or optical disc writer is designed to be able to keep the focus length from the optical disc in order to read data, the so-called focus. Therefore, although the vertical deviation disc wobbles along the perpendicular direction of the spinning level, the pickup head can follow the wobbling of the optical disc and keep focusing to read data.

Because the prevention of vertical deviation of an optical disc is considered to be the responsibility of the disc manufacturers, and because some of the vertical deviation discs are still readable, manufacturers of optical disc player and optical disc writer usually ignore the problem of vertical deviation. Users of optical disc players and optical disc writers depend on the abnormal noise made while the optical disc is spinning in the machine or on inconsistent quality of reading or writing to determine whether the optical disc presently used is a vertical deviation disc. Therefore, the conventional optical disc player and optical disc writer lack a vertical deviation disc detection method.

SUMMARY OF THE INVENTION

It is, therefore, a primary objective of the present invention to provide a method of vertical deviation disc detection for optical disc players or optical disc writers to solve the problems mentioned above.

According to the present invention, a method is provided for detecting whether vertical deviation of an optical disc occurs while the optical disc is spinning in an optical disc player. The optical disc player comprises a pickup head and a focus actuator. The pickup head is predeterminedly installed in a balanced position at a focal distance from the optical disc for reading data on the optical disc and generates a focus error signal. When the pickup head approaches and then moves away from the balanced position, a S-curve appears in the focus error signal. The focus actuator actuates the pickup head according to an input control signal, so that the pickup head is kept substantially at the focal distance from the optical disc.

When the optical disc player has not yet successfully focused on the optical disc, the waveform of the input control signal is designed to enable the actuator to actuate the pickup head back and forth repeatedly within a predetermined range. Consequently, the pickup head will generate the focus error signal that comprises a plurality of S-curves. A focus controller identifies the zero crossing points of S-curves in the focus error signal, and obtains a plurality of input control values in the input control signal corresponding to the zero crossing points. In the method, the variation of the input control values is calculated, and whether vertical deviation of the optical disc has occurred is determined according to a predetermined vertical deviation judgment procedure.

The vertical deviation disc detection method according to the present invention can be employed in the system of an optical disc player or optical disc writer to have the focus actuator actuate the pickup head repeatedly within a predetermined range. This method also uses the variation of the plurality of input control values in the input control signal corresponding to the zero-crossing points of the S-curves in the focus error signal, thus determining whether vertical deviation has occurred. Alternatively, when an optical disc is focused, the present invention can use the variation of input control values to determine whether vertical deviation occurs. Therefore, in the present invention, an optical disc player or optical disc writer can detect a vertical deviation disc, and according to the method provided by the present invention, it restricts the maximum speed of writing or reading on a vertical deviation disc to reduce the noise and to strengthen the stability of writing or reading.

It is an advantage of the present invention that the detection method can detect a vertical deviation disc. As a result, the user is informed whether an optical disc is a vertical deviation disc, directly from the optical disc player or optical disc writer.

These and other objectives of the present invention will no doubt become obvious to those skilled in the art after reading the following detailed description of the preferred embodiment, which is illustrated in various figures and drawings.

DETAILED DESCRIPTION OF THE PREFERRED EMBODIMENT

Figure 1:
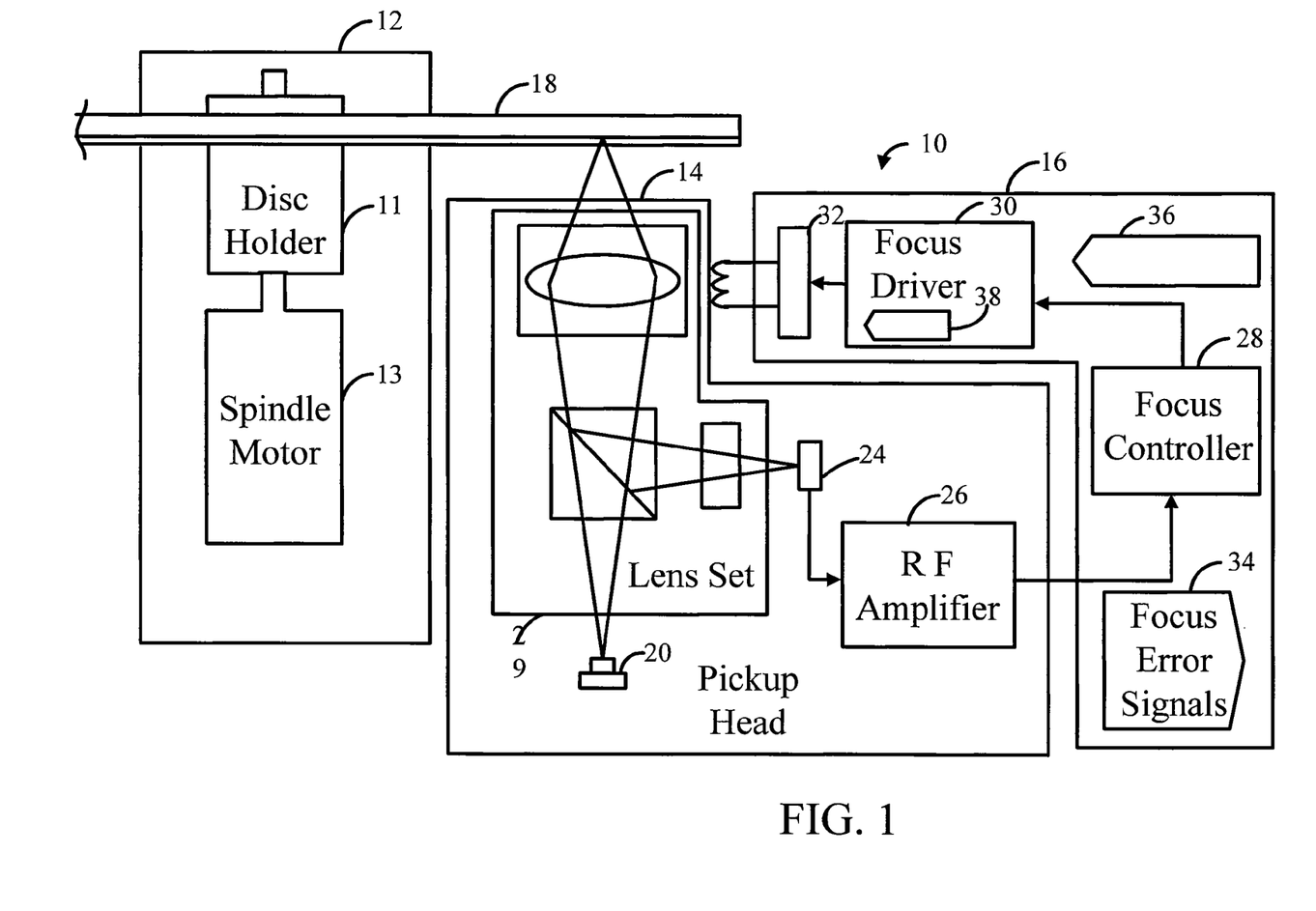
FIG. 1 is a schematic diagram of an optical disc player, which is equipped with a vertical deviation disc detection method according to the present invention.

Please refer to FIG. 1. FIG. 1 is a schematic diagram of an optical disc player 10, which is equipped with a vertical deviation disc detection method according to the present invention. The vertical deviation disc detection method, according to the present invention, is used to detect whether optical deviation occurs while an optical disc 18 is spinning in the optical disc player 10. The optical disc 18 comprises a data layer to record data thereon. The optical disc player 10 comprises a spinning module 12, a pickup head 14, and a control circuit 16. The spinning module 12 is used to spin the optical disc 18. The spinning module 12 comprises a disc holder 11 to hold the optical disc 18 at a horizontal level and a spindle motor 13 to spin the optical disc 18 around a predetermined center.

The pickup head 14 is predeterminedly installed in a balanced position at a focal distance from the optical disc 18 for reading data on the optical disc 18 and then generating a focus error signal 34. When the pickup head 14 approaches and then moves away from the balanced position, an s-shaped curve, known as S-curve, appears in the focus error signal 34.

The pickup head 14 comprises a laser diode 20, a photo sensor 24, a RF amplifier 26, and a lens set 29. The laser diode 20 emits a reading lightbeam of a specific wavelength to read the data on the optical disc 18. The photo sensor 24 receives the lightbeam reflected from the optical disc 18 and then generates a set of RF signals. The RF amplifier 26 performs signal amplification and signal processing on the RF signals to generate the focus error signal 34. The lens set 29 assists the focusing of the laser diode 20 and the photo sensor 24.

The lightbeam emitted from the laser diode 20 can be read by the photo sensor 24 after the lightbeam being reflected by the optical disc 18. The photo sensor 24 can generate a set of RF signals according to several focus error detection methods such as knife-edge method, astigmatic method or light measuring method. The RF amplifier 26 processes the set of RF signals and generates the focus error signal 34.

The control circuit 16 comprises a focus controller 28, a focus driver 30 and the focus actuator 32. The focus controller 28 receives the focus error signal 34. When the optical disc player 10 has not yet successfully focused on the optical disc 18, the control circuit 16 is an open loop. The focus controller 28 can generate an input control signal 36 according to its operating needs. When the optical disc player 10 focuses on the optical disc 18, the control circuit 16 becomes a close-loop. According to the focus error signal 34 it receives, the focus controller 28 will generate the input control signal 36 and send to the focus driver 30.

According to the input control signal 36, the focus driver 30 generates a driving current 38 to drive the focus actuator 32, which in turn drives the pickup head 14 correspondingly. The focus actuator 32 actuates the pickup head 14 along a plane that is perpendicular to the spinning plane of the optical disc 18. Therefore, the focus actuator 32 correspondingly actuates the pickup head 14 according to the input control signal 36; as a result, the pickup head 14 is kept substantially at the focal distance from the optical disc 18.

Figure 2:
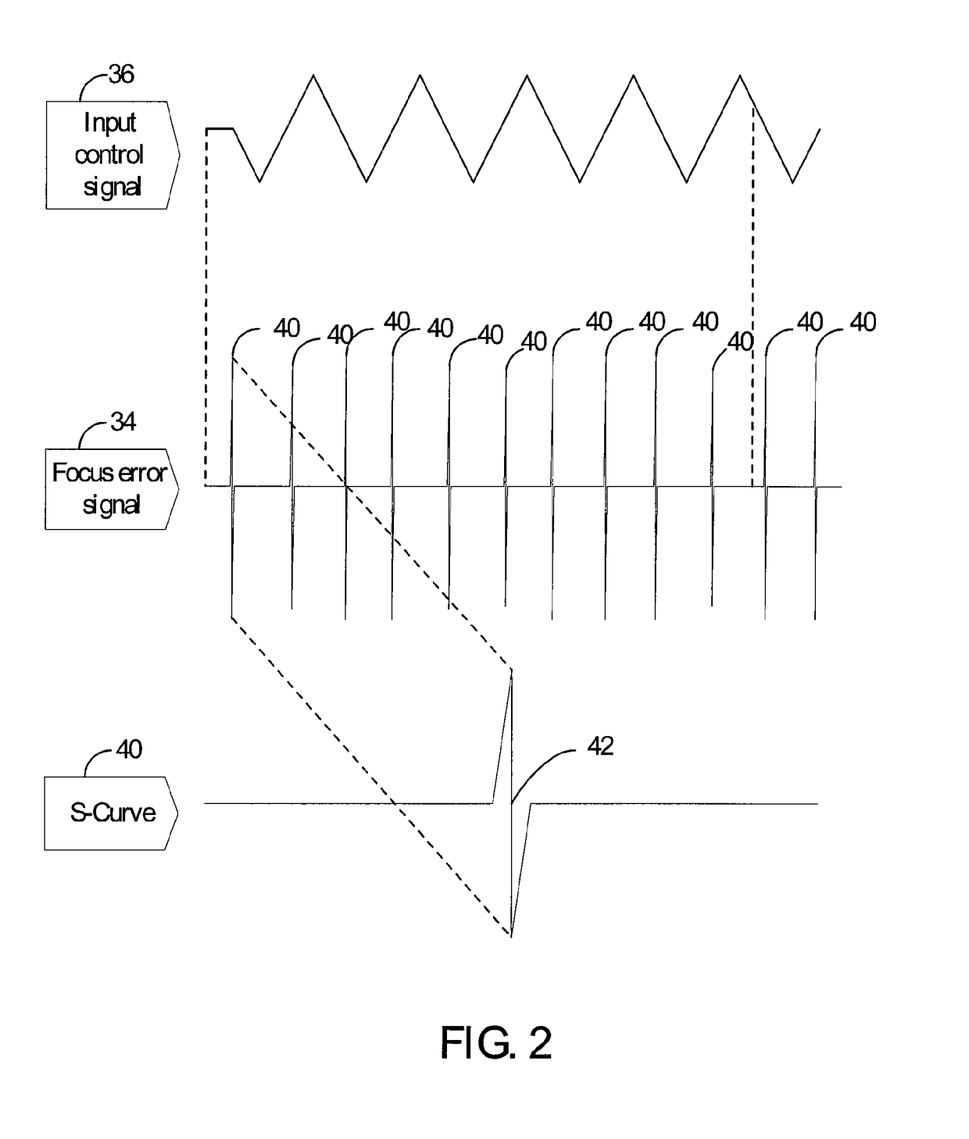
FIG. 2 is the sketch of the waveforms of the focus error signal and the input control signal in FIG. 1.
Figure 3:
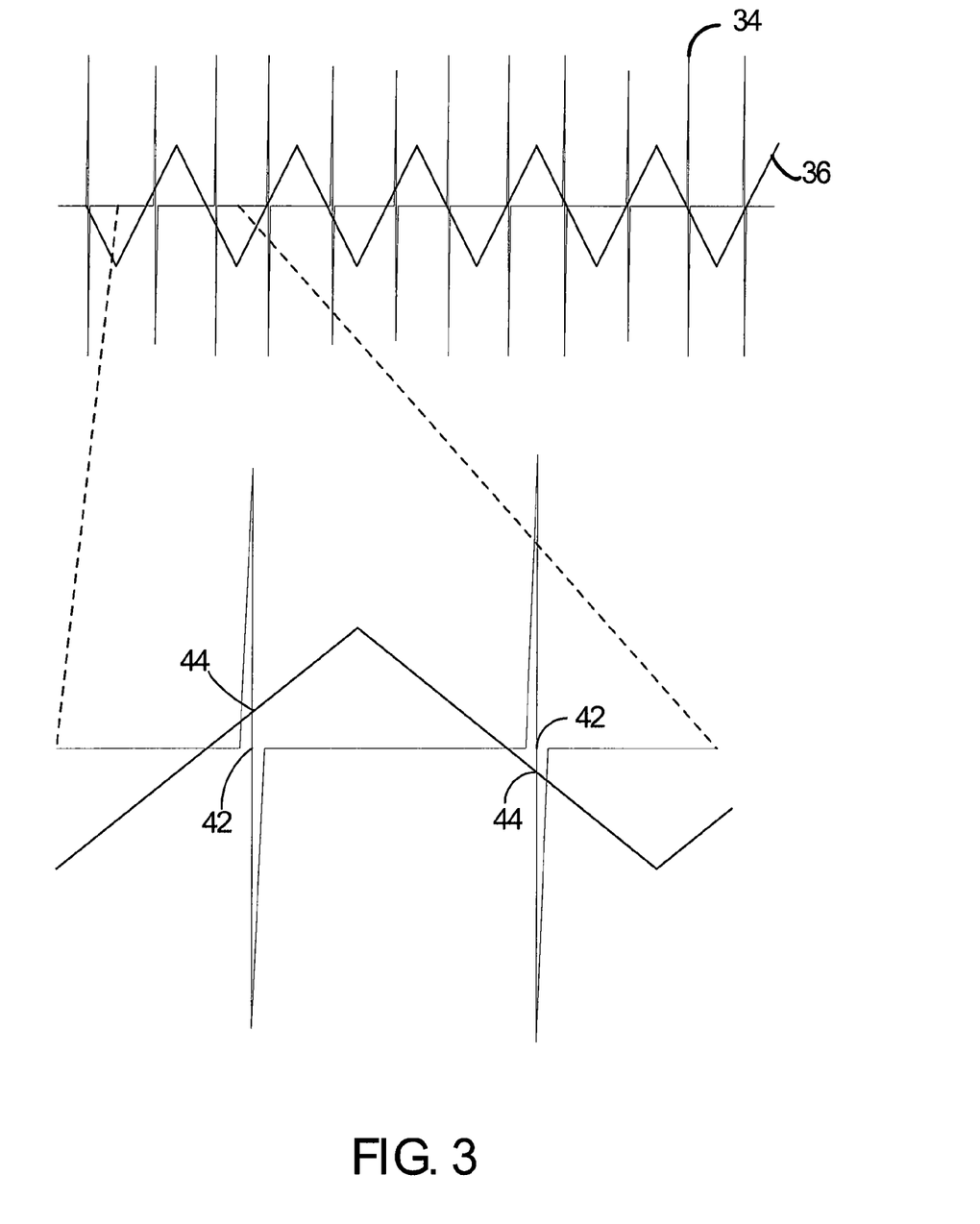
FIG. 3 is the sketch of the waveform of the focus error signal in FIG. 2 superimposed with the waveform of the input control signal.

Please refer to FIG. 2 & FIG. 3. FIG. 2 is the sketch of the waveforms of both the focus error signal 34 and the input control signals 36 in FIG. 1. FIG. 3 is the sketch of the waveform of the focus error signal 34 in FIG. 2 superimposed with the waveform of the input control signal 36. With the focus error signal 34 and input control signals 36, the vertical deviation disc detection method of the present invention will be explained in the following paragraphs. When the optical disc player 10 is not yet focused on the optical disc 18, an input control signal 36, that is designed to be a sawtooth waveform, is first transmitted to the focus actuator 30 (FIG. 1). The input control signal 36 is the focus actuator input voltage that actuates the pickup head 14 back and forth repeatedly in a predetermined range along a plane that is perpendicular to the spinning plane of the optical disc 18. The value of every sawtooth focus actuator input voltage is proportional to the distance between the pickup head 14 and the optical disc 18. The repeated movement of the pickup head 14 generates a focus error signal 34 that comprises a plurality of S-curves 40, and the zero crossing points 42 of the S-curves 40 occur when the distance between the pickup head 14 and the optical disc 18 is the focal distance.

As shown in FIG. 3, the zero crossing points 42 of the S-curves 40 in the focus error signals 34 are identified to calculate the input control values 44 corresponding to the zero crossing points 42 on the input control signal 36. The input control values 44 are the input voltages of the focus actuator 32. The focus controller calculates the variation of those input control values 44 and determines whether the optical disc 18 vertically deviates according to a predetermined vertical deviation judgment procedure.

In the vertical deviation judgment procedure, the focus controller 28 determines whether the optical disc 18 vertically deviates by performing sorting on the input control values 44, which correspond to the zero crossing points 42, by using the difference between the maximum and the minimum of the input control values 44 to represent the variation of the input control values 44, and by comparing the difference with a predetermined vertical deviation disc threshold.

When the optical disc 18 is determined to be a vertical deviation disc, the focus controller 28 then restricts the maximum speed of reading or writing. For example, when the optical disc 18 is determined to be a vertical deviation disc, the focusing controller 28 lowers down the speed of reading from 48× to 32×. By lowering the speed, the noise is reduced, and the stability is strengthened while using a vertical deviation disc by an optical disc player or writer.

As to the method to determine the vertical deviation disc threshold, the aforementioned detection method is performed in advance separately on at least one tilted optical disc and on at least one normal optical disc to derive the corresponding variation between the two. The vertical deviation disc threshold is then accordingly determined, based on statistical principles and rule of thumb.

According to the present invention, the detection method of vertical deviation disc uses the focus error signal 34 and the sawtooth designed input control signal 36, so as to calculate the variation of the displacement of the pickup head 14 along the perpendicular direction when the distance between the pickup head 14 and the optical disc 18 is the focal distance.

And in the detection method, whether the vertical deviation of the optical disc has occurred is determined according to the variation. Comparing with the conventional optical disc player or writer that depends on the user to determine whether vertical deviation of the optical disc occurs according to abnormal noises or to the instability of data reading or data writing, the present invention can do the same thing with the optical disc player or optical disc writer itself through quantitative data. According to the present invention, the detection method can also restrict the maximum speed of reading or writing to reduce the noise and to strengthen the stability of reading and writing.

Figure 4:
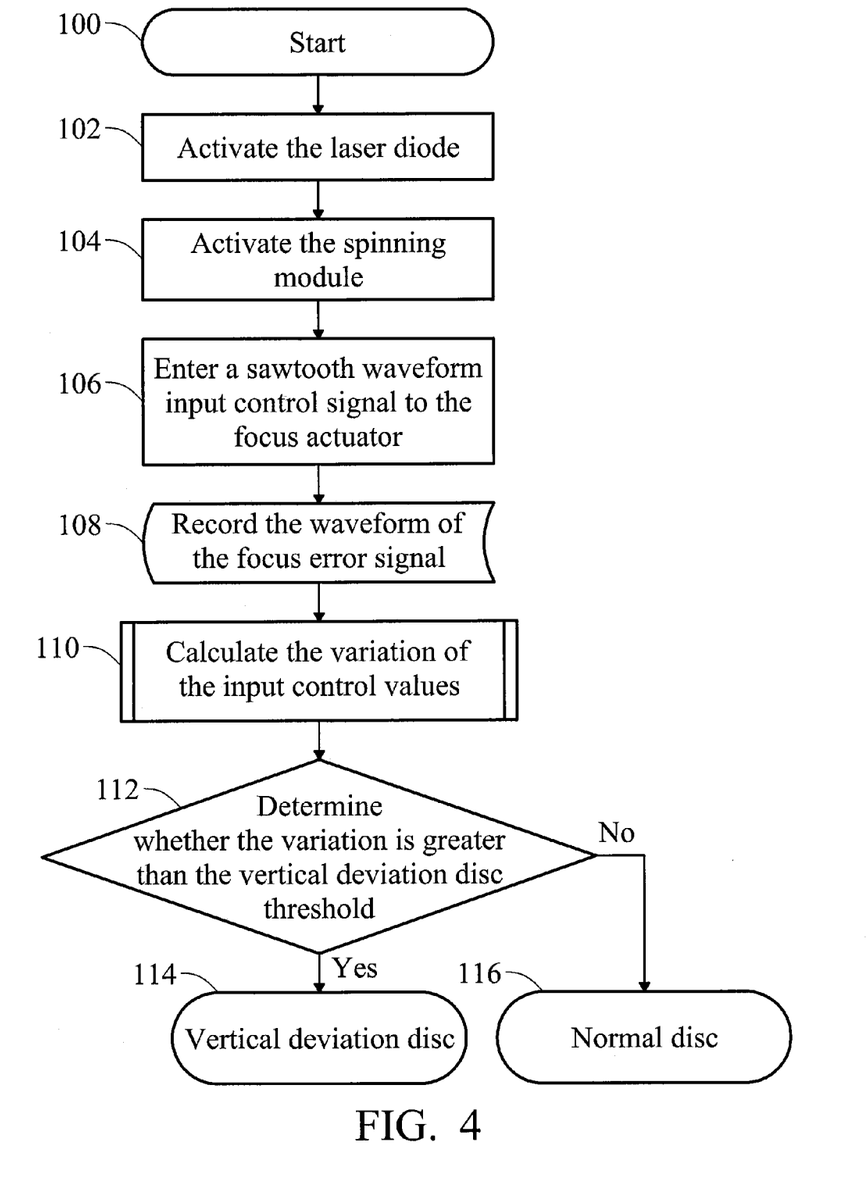
FIG. 4 is the flow chart of the vertical deviation disc detection method according to the present invention.

Please refer to FIG. 4. FIG. 4 is the flow chart of the vertical deviation disc detection method according the present invention. With FIG. 1, the vertical deviation disc detection method according to the present invention comprises the following steps:

Step 100: Start.
Step 102: Activate the laser diode 20.
Step 104: Activate the spinning module 12.
Step 106: Enter the input control signal 36 that is designed to be a sawtooth waveform to the focus actuator 30, so as to have the focus actuator 30 to actuate the pickup head 14 back and forth repeatedly in a predetermined range.
Step 108: Record the waveform of the focus error signal 34.
Step 110: Identify the zero crossing points 42 of the plural S-curves 40 in the focus error signal 34, and calculate the input control values 44 which correspond to the zero crossing points 42 in the input control signal 36. Sort those input control values 44. The difference between the maximum and the minimum of the input control values 44 is used to represent the variation of the input control values 44.
Step 112: Determine whether the variation is greater than the vertical deviation disc threshold. If the answer is yes, go to step 114; if not, jump to step 116.
Step 114: Determine the optical disc 18 to be a vertical deviation disc. Stop.
Step 116: Determine the optical disc 18 to be a normal disc.

The vertical deviation disc threshold is determined by performing the steps from 100 to 110 in FIG. 4 with many normal and vertical deviation discs separately to calculate the corresponding variation between normal and vertical deviation discs, and according to statistic principles and rule of thumb to determine the vertical deviation disc threshold.

Figure 5:
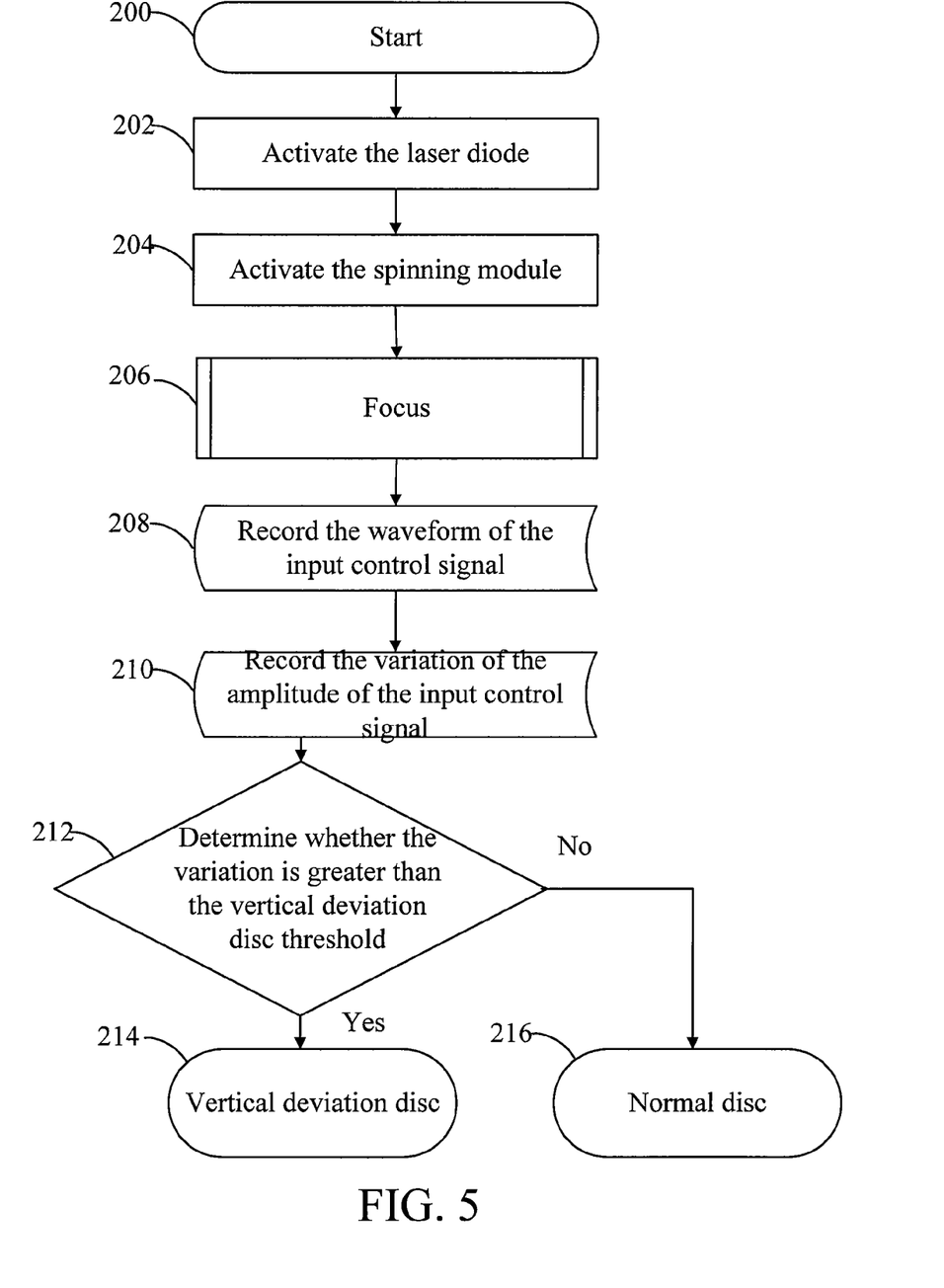
FIG. 5 is the flow chart of another embodiment of vertical deviation disc detection method according to the present invention.

Please refer to FIG. 5. FIG. 5 is the flow chart of another embodiment of vertical deviation disc detection method according to the present invention. Another embodiment according to the present invention is related to a vertical deviation disc detection method when the optical disc player 10 already focuses on the optical disc 18. This vertical deviation disc detection method comprises the following steps:

Step 200: Start.
Step 202: Activate the laser diode 20.
Step 204: Activate the spinning module 12.
Step 206: Focus on the optical disc 18.
Step 208: Record the waveform of the input control signal 36.
Step 210: Record the variation of the amplitudes of input control signal 36.
Step 212: Determine whether the variation is greater than the vertical deviation disc threshold. If the answer is yes, go to the step 214; if not, jump directly to step 216.
Step 214: Determine the optical disc 18 to be a vertical deviation disc. Stop.
Step 216: Determine the optical disc 18 to be a normal disc.

Focus is a normally used technology on optical disc players or optical disc writers. The focus controller 28 determines whether the pickup head 14 and the optical disc 18 are kept at the focal distance from each other by the focus error signal 34. The focus controller 28 then generates an input control signal 36 to actuate the pickup head 14 so as to keep the pickup head 14 and the optical disc 18 at the focal distance from each other.

Figure 6:
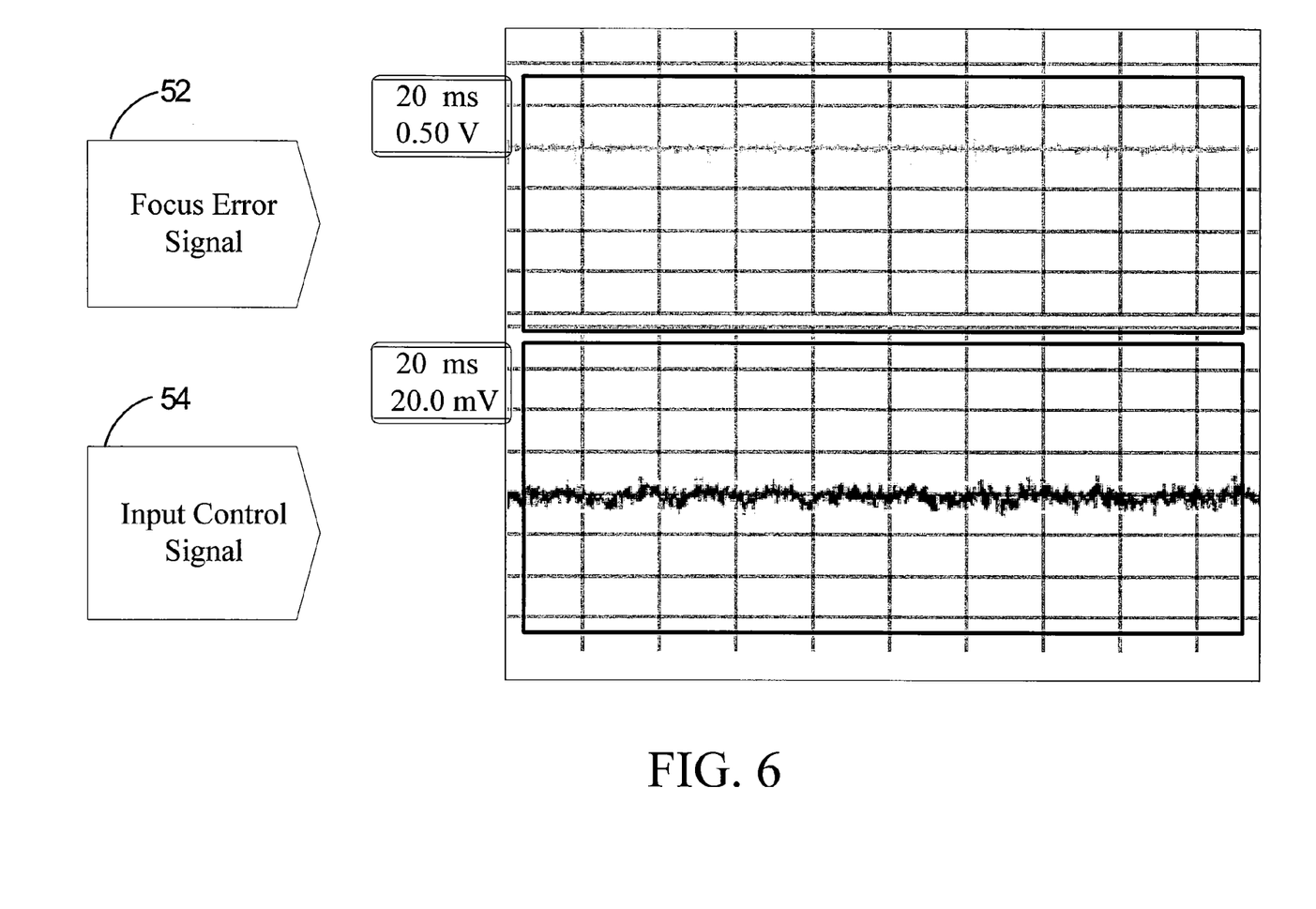
FIG. 6 is the sketch of both the waveforms of the focus error signal and of the input control signal when the optical disc player is focusing on a normal disc.
Figure 7:
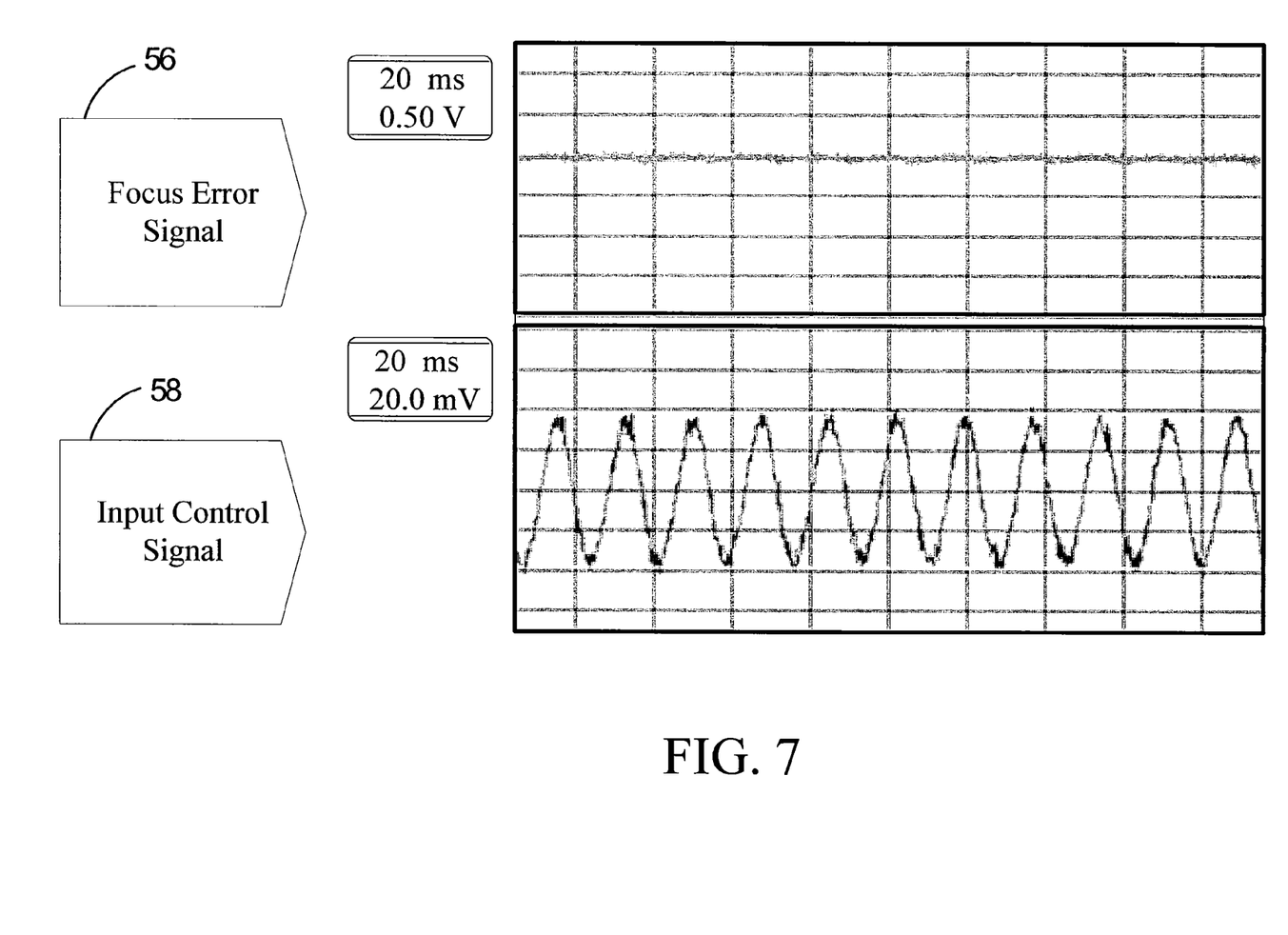
FIG. 7 is the sketch of both the waveforms of the focus error signal and of the input control signal when the optical disc player is focusing on a vertical deviation disc.

Please refer to FIG. 6 and FIG. 7. FIG. 6 is the sketch of both the waveforms of the focus error signal 52 and the input control signal 54 when the optical disc player is focusing on a normal disc. FIG. 7 is the sketch of both the waveforms of the focus error signal 56 and the input control signal 58 when the optical disc player is focusing on a vertical deviation disc. From FIG. 6 and FIG. 7, it can be found that when the optical disc is focused, the focus error signal 52 and 56 of a normal disc and a vertical deviation disc, respectively, are substantially kept at a certain value. The input control signals 54 and 58 are the focus actuator input voltages of the focus actuator 30, and the signals can represent the function of displacement of the pickup head 14.

As shown in FIG. 7, when vertical deviation occurs, the focus actuator 28 must generate an input control signal 58 with a greater variation so as to keep the pickup head 14 at the focal distance from the vertically wobbling optical disc 18. This embodiment uses such characteristic of the input control signals 58, when the optical disc 18 is focused, to determine whether the optical disc 18 is a vertical deviation disc. In a practical operation, a filter can be employed to filter the high frequency noise of the waveform of the input control signal 58.

Summing up the above-mentioned descriptions, in the vertical deviation disc detection method according to the present invention, the optical disc player or optical disc writer repeatedly actuates the pickup head back and forth in a predetermined range, and thus, determines whether vertical deviation occurs with the variation of the plural input control values in the input control signal; the input control values correspond to the zero crossing points of the S-curves in the focus error signal. Alternatively, when the optical disc is focused, the present invention uses the variation of the input control values to determine whether vertical deviation of an optical disc occurs. Therefore, the present invention can allow the optical disc player or optical disc writer to detect a vertical deviation disc through a quantitative method and can restrict the maximum speed of reading or writing according to the above-mentioned method to reduce the noise and to strengthen the stability of reading or writing.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:
1. A detection method for detecting whether vertical deviation of an optical disc occurs, comprising the steps of:
before a pickup head is successfully focused on the optical disc, based on an input control signal, actuating the pickup head so as to generate a focus error signal with a plurality of S-curves;
identifying a plurality of zero crossing points of the S-curves in the focus error signal and obtaining a plurality of input control values respectively corresponding to the zero crossing points;
calculating a variation of the input control values; and determining whether vertical deviation of the optical disc occurs according to the variation of the input control values.

2. The detection method of claim 1, wherein the input control signal is relative to an input voltage of a focus actuator for actuating the pickup head, and a value of the input voltage is relative to a distance between the pickup head and the optical disc.

3. The detection method of claim 1, wherein the input control signal has a sawtooth waveform.

4. The detection method of claim 1, further comprising the step of:
   limiting a maximum speed for writing or reading the optical disc when the vertical deviation of the optical disc is detected.

5. The detection method of claim 1, wherein the step of calculating comprises sorting the input control values and calculating a difference between a maximum and a minimum of the input control values to represent the variation of the input control values; the step of determining comprises comparing the difference with a vertical deviation disc threshold.

6. The detection method of claim 5, further comprising the steps of:
   performing the steps of actuating, identifying, obtaining and calculating on a tilt optical disc to generate a first variation;
   performing the steps of actuating, identifying, obtaining and calculating on a normal optical disc to generate a second variation; and
   determining the vertical deviation disc threshold based on the first variation and the second variation.

* * * * *